No. 666,888. Patented Jan. 29, 1901.
J. A. SHERMAN.
MACHINE FOR MAKING ENVELOPS.
(Application filed July 27, 1900.)
(No Model.) 9 Sheets—Sheet 1.

Fig. 1.

WITNESSES:
M. E. Flaharty
Saul Lippenstein

INVENTOR:
John A. Sherman

No. 666,888. Patented Jan. 29, 1901.
J. A. SHERMAN.
MACHINE FOR MAKING ENVELOPS.
(Application filed July 27, 1900.)
(No Model.) 9 Sheets—Sheet 3.

Fig.3.

WITNESSES:
INVENTOR:

No. 666,888.

Patented Jan. 29, 1901.

J. A. SHERMAN.
MACHINE FOR MAKING ENVELOPS.
(Application filed July 27, 1900.)

(No Model.)

WITNESSES:
M. E. Flaherty
Saul Sippustein

INVENTOR:
John A. Sherman

UNITED STATES PATENT OFFICE.

JOHN A. SHERMAN, OF WORCESTER, MASSACHUSETTS.

MACHINE FOR MAKING ENVELOPS.

SPECIFICATION forming part of Letters Patent No. 666,888, dated January 29, 1901.

Application filed July 27, 1900. Serial No. 25,006. (No model.)

*To all whom it may concern:*

Be it known that I, JOHN A. SHERMAN, of Worcester, in the county of Worcester and State of Massachusetts, have invented a new and useful Improvement in Machines for Making Envelops, of which the following is a specification.

My invention relates to various improvements in envelop-machines whereby a better product is more rapidly and surely made than has heretofore been the case; and for this purpose it consists in mechanism for gumming the envelop, mechanism for folding the envelop, and mechanism for withdrawing the envelop from the drier in which it is dried after the folding operation has taken place, all coöperating in the one machine to bring about the desired result.

My invention will be understood by reference to the drawings, in which—

Figs. 6 and 7 are a plan and section, respectively, of the new folding-box mechanism referred to.

Figure 5:
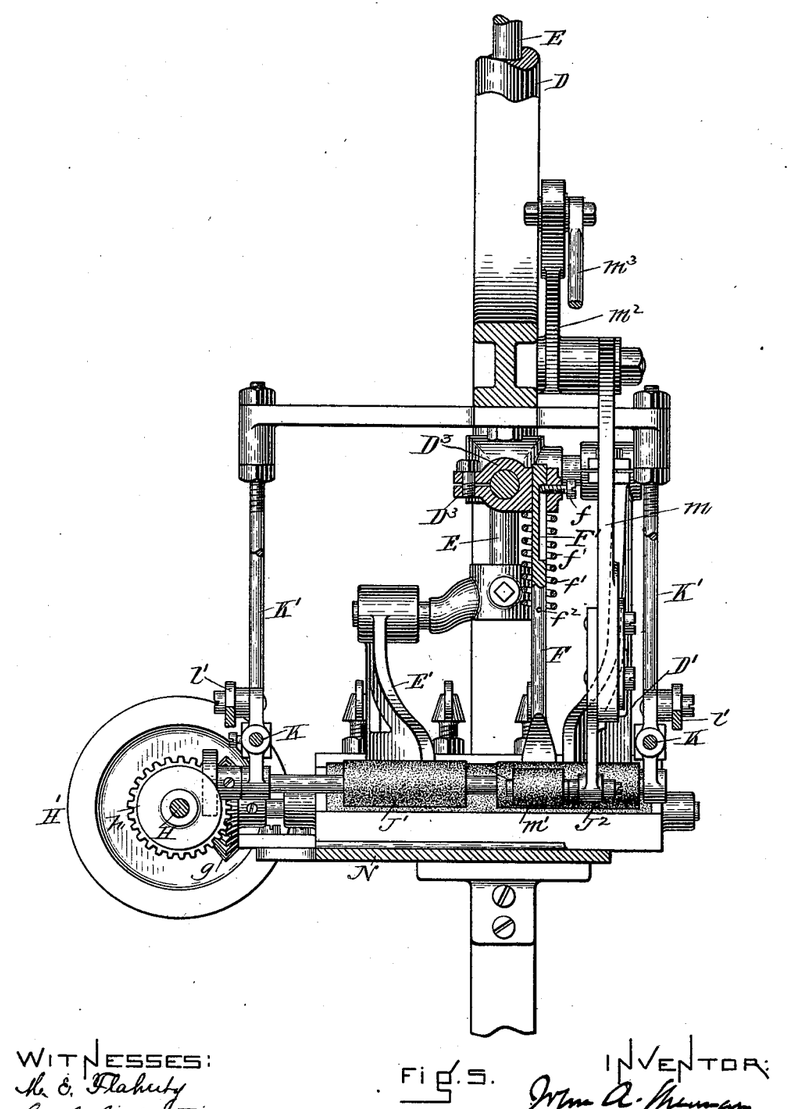
Figure 6:
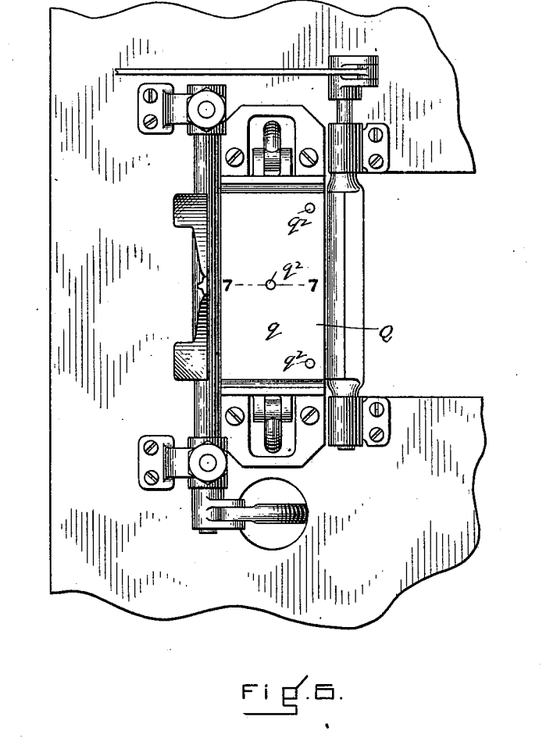
Figure 7:
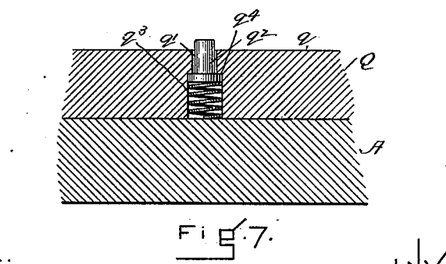

A represents the table, suitably supported on legs B and supporting the frame C. D is a sleeve mounted in said frame and carrying at its lower end the picker D'. E is a rod passing down through the sleeve and carrying at its lower end the picker E'. These two parts are reciprocated in a manner well known to those skilled in the art, and hence their operating mechanism is not further shown or described. To the lower end of the sleeve D is also attached an arm $D^2$, on which is a clamp $D^3$, in which is mounted an auxiliary or end picker F for gumming one end of the envelop. A set-screw $f$ passes through a portion of the clamp into an elongated groove F' in the picker F. (See Fig. 5.) This screw $f$ prevents the picker from falling out from the clamp and yet allows it to have a vertical movement. To hold the picker down, a spring $f'$ surrounds it, bearing at its upper end against the clamp $D^3$ and at the lower end against the pin $f^2$. By removing the set-screw $f$ it will be seen that this picker may be removed in case it is not needed. The purpose of this picker is to gum the end of one of the end flaps of an envelop, and it is especially useful in the manufacture of high-cut envelops, where there is a considerable portion of the envelop projecting above the edge of the back flap.

The mechanism shown for gumming the pickers is as follows:

G is the gum-box, of ordinary construction, provided with a roll G', these parts being arranged in the ordinary manner and the roll receiving motion from the shaft H, with which it is connected by the gears $g$ $h$. Power is applied to this shaft by means of the pulley H' and the belt $H^2$, which connect it with the main shaft X.

J is the gum-roll proper, consisting, as shown, of a shaft having two sleeves J' $J^2$ for carrying the gum, one of the sleeves being located in line to apply gum to the picker D' and the other to the picker E'. This gum-roll J is mounted in bearings $j$, which travel upon rods K, supported from the frame C by the hangers K'. The extent of travel of the gum-roll J is sufficient to bring the sleeves J' $J^2$ into contact with the roll G and then carry them back under the pickers D' E' to a corresponding point on the other side of the machine. The bearings $j$ are reciprocated by means of the cam L, to which these bearings are connected by connecting-rods $l$ and arms $l'$, which project from the rocking sleeve $l^2$, supported in bearings $l^3$ upon the table A, this sleeve also having a third arm $l^4$, which has projecting downward from it a connecting-rod $l^5$, the lower end of which is connected with a cam-lever $l^6$, mounted on the stud $l^7$, projecting from the side of one of the legs B. This cam-lever $l^6$ carries a cam-roll $l^8$, which runs in the groove in the cam L. This mechanism is one of those adapted for reciprocating the gum-rolls and is well understood by all skilled in the art. In itself it forms no part of my invention and is only shown as a convenient means for operating the additional mechanism now to be described.

Figure 4:
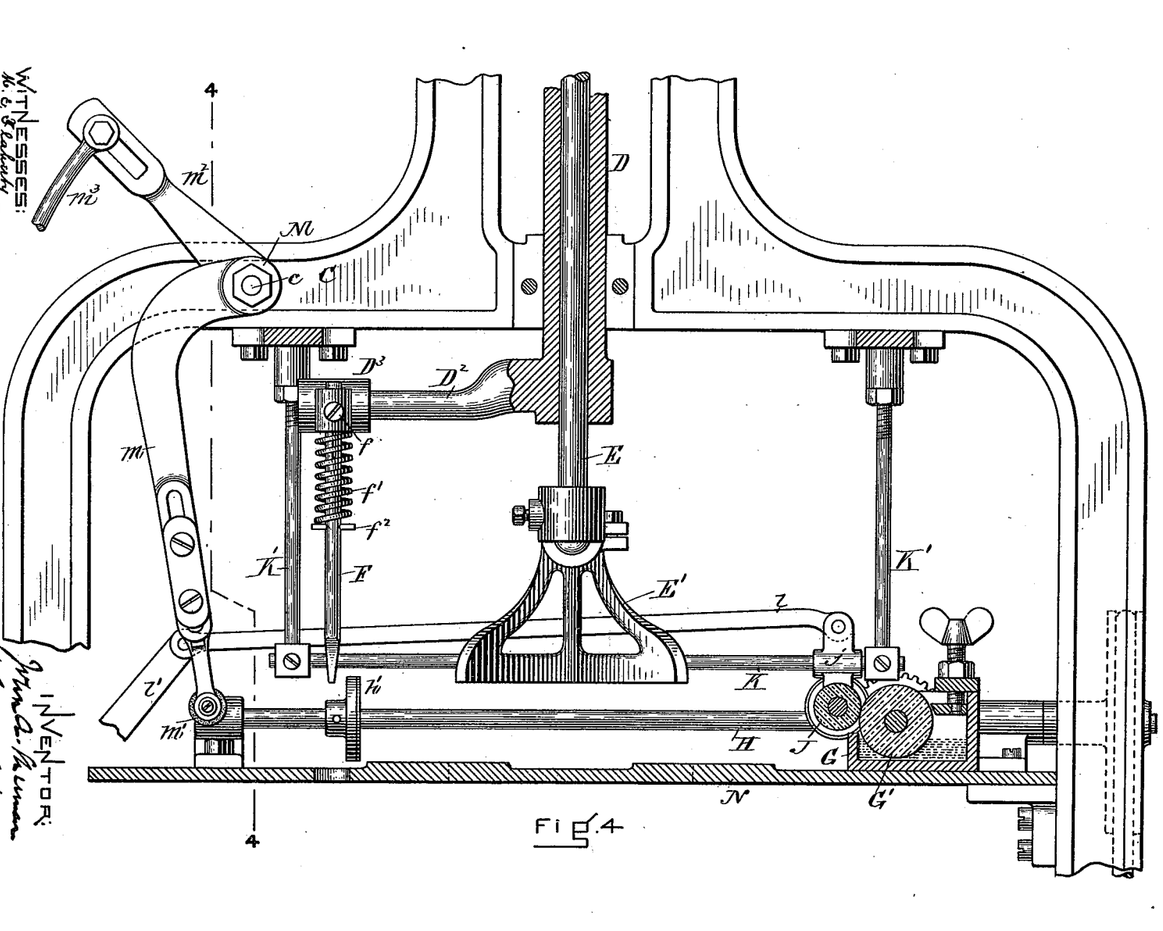

In order to gum the end picker F, I have provided a small gummer $m'$, which I prefer to mount and operate in the following manner: On the frame C is a stud $c$, which carries a rocking sleeve M. From this sleeve M projects downward an arm $m$, carrying at its lower end the gummer $m'$. The sleeve M also carries an arm $m^2$, projecting upward and connected by a connecting-rod $m^3$ with the arm $l^4$, which forms a portion of the mechanism for reciprocating the gum-roll J. It will be seen that whenever the gum-roll J is on the left side of the machine—that is, the side opposite to that having the gum-box—this arrangement of levers and connecting-rods is such that the gummer $m'$ is in contact with the gum-roll. When, however, the gum-roll is at the farther side of the machine getting gum at the gum-box, the gummer $m'$ is in the position shown in Fig. 4, having been swung into that position about the axis of the sleeve M.

In order that the gummer $m'$ may be properly gummed by the gum-roll J, one of these parts should be rotated, and I prefer for this purpose to apply power to the gum-roll J while it is in contact with the gummer $m'$, one method of doing which is shown in the drawings. The shaft H runs in bearings $H^3$, located one on each side of the plate N, which supports the gum-box and which, in fact, acts as a pull-off to pull the gummed envelop from the pickers. At its left-hand end this shaft H has a friction-disk $h'$, so located upon the shaft that when the gum-roll J is at the left-hand side of the machine a roll $j'$ on the end of its shaft engages with this friction-disk $h'$ and is rotated thereby, so as to give the necessary rotary motion to the gum-roll J. When the gum-roll is in this position, the gummer $m'$ is in contact with the sleeve $J^2$ and rotates with it by friction, so that its entire periphery is gummed.

The operation of gumming blanks by means of this mechanism is as follows: Blanks having been put upon the blank-supporting table P, which may be supported and operated in any one of the number of well-known ways, and the machine being started up, the roll G in the gum-box being rotated and the sleeves $J'$ $J^2$ being in contact therewith, the sleeves receive gum therefrom and then are carried across under the pickers $D'$ $E'$, which at this moment are raised, applying gum to their under surfaces. The moving of the gum-roll J to the opposite side of the machine causes the small roll $m'$ to be moved forward to meet the sleeve $J^2$, striking the picker F in its transit, so that when the sleeve $J^2$ is in its extreme left-hand position and the friction-disk $j'$ is in contact with the friction-disk $h'$ on the shaft H it will be rotated thereby, thus communicating its motion to the small roll $m'$ and giving to it the necessary supply of gum. The pickers having descended gum and lift a blank, and the blank having been pulled off from the pickers by the pull-off N the rolls start back, the sleeves $J'$ $J^2$ gumming their respective pickers on the way and the gummer $m'$ passing under and gumming the lower surface of the end picker F. The sleeves $J'$ $J^2$ finally reach their extreme right-hand position, where they get gum from the gum-box, as before, and the gummer $m'$ reaches its extreme left-hand position, where it is out of the way of the picker F, and the pickers descend again to gum the next blank. The operation thereafter is repeated as before. It is evident that this operation may be so timed that the gum-roll will make one complete movement backward and forward between each reciprocation of the pickers; but this seems unnecessary unless the roll needs gum, as of course it reduces the product of the machine substantially one-half. It is also evident that the gummer $m'$ may be caused to travel to and from the source of gum-supply by independent mechanism or other ways than that above described. For example, it may be reciprocated instead of oscillated and may be operated from other source of power than that which operates the gum-roll; but the mechanism above described is very simple and may be easily attached to any machine having a reciprocating gum-roll, so as to be operated from the gum-roll cam without further addition to the machine, or the gum-roll may be caused to travel by other means than that shown or in some path other than a direct line, my main improvement being the use of this independent gummer to gum the end picker, preferably oscillated by means of the part which causes the gum-roll to travel and without the use of an extra gum-box.

In order that the machine may be adjusted, if necessary, it is desirable that the arm $m$ shall be adjustable in length and also that the various pivotal connections shall be adjustable.

After the blank has been properly gummed, for example, in the manner above referred to and has been pulled off from the pickers by the pull-off N it falls upon a carriage $N'$, which may be of any ordinary construction and operated in any ordinary manner, and is carried under the plunger $N^2$, which forces it down through the creasing-frame $N^3$ and into the folding-box Q. These mechanisms are not further described, as they are all well-known parts of an envelop-machine and their ordinary construction and operation are well known to those skilled in the art, except as below described. This folding-box is provided with four folding-wings and with mechanism for ejecting the envelop therefrom, the folding-wings and pushing mechanism preferably used being that described in Letters Patent to me, No. 648,674, dated May 1, 1900, and hence is not further described herein. I have found, however, that in all folding-boxes there is danger when working on printed work, where the ink perhaps may not be absolutely dry when the envelop reaches the folding-box, that the pressure of the folding operation will cause the blank when folded to stick to the bed or bottom of the box, so that it cannot be easily pushed therefrom by the ordinary means, or if the bed be hinged will not drop therefrom. For this purpose I have provided the mechanism now to be described.

Figure 1:
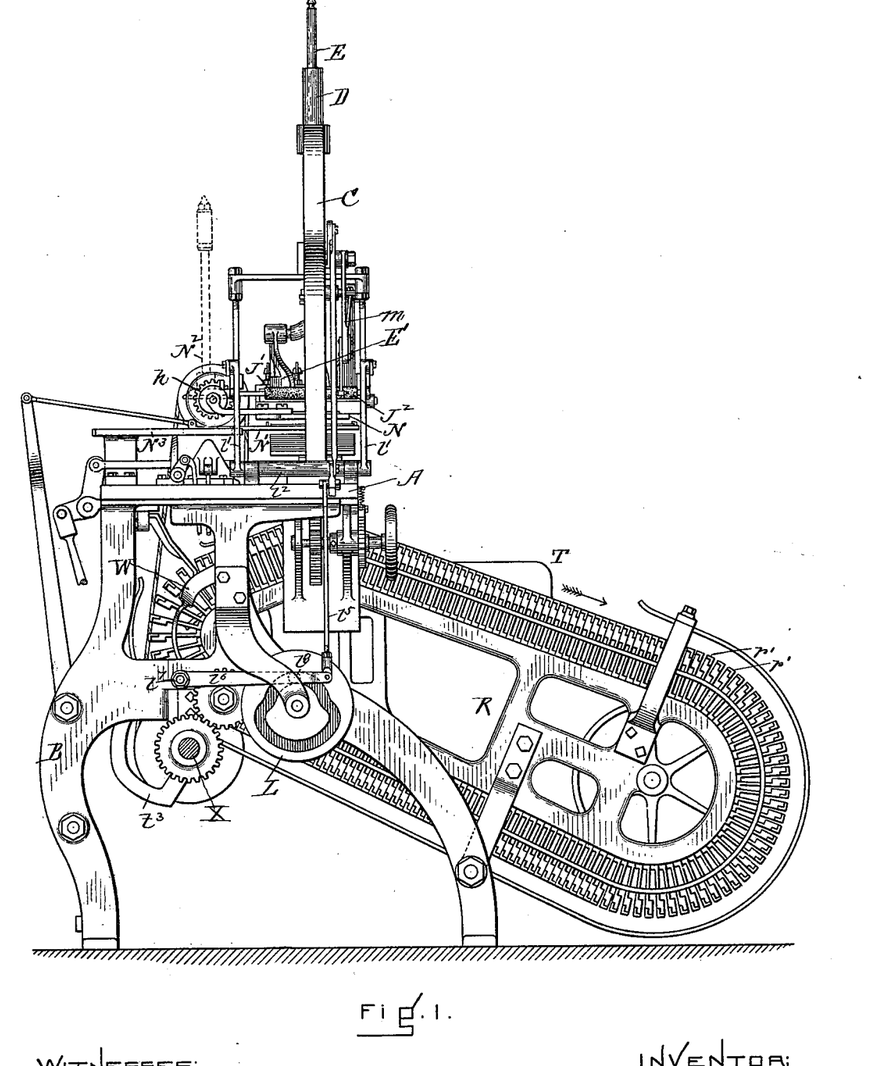
Figure 1 is a side elevation of a machine embodying my invention.
Figure 2:
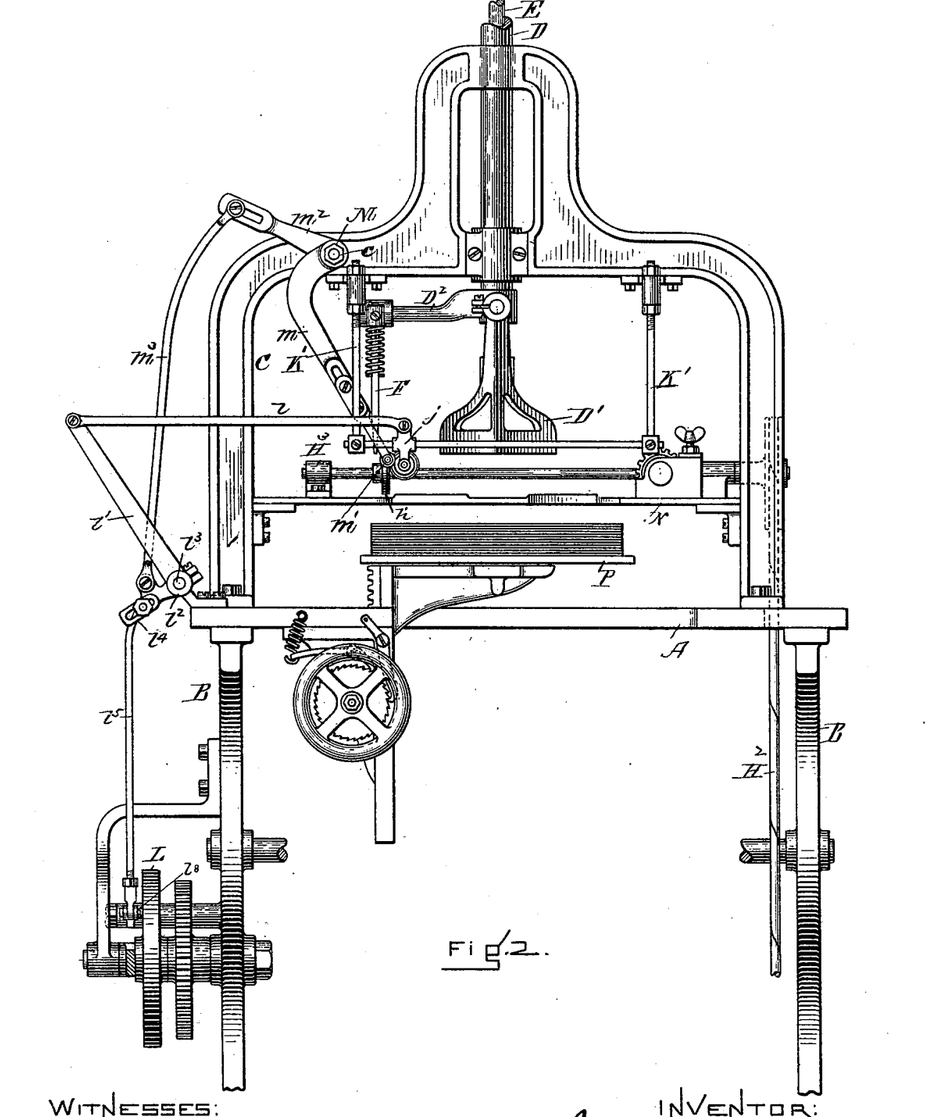
Fig. 2 is a front elevation of a portion of the machine, showing the gumming mechanism, the other portions of the machine being omitted for the sake of clearness, Fig. 3 being a plan view of the mechanism shown in Fig. 2, Fig. 4 an enlarged sectional elevation, and Fig. 5 a side elevation of this mechanism, partly in section, and also enlarged and taken substantially on the line 5 5 of Fig. 4.
Figure 3:
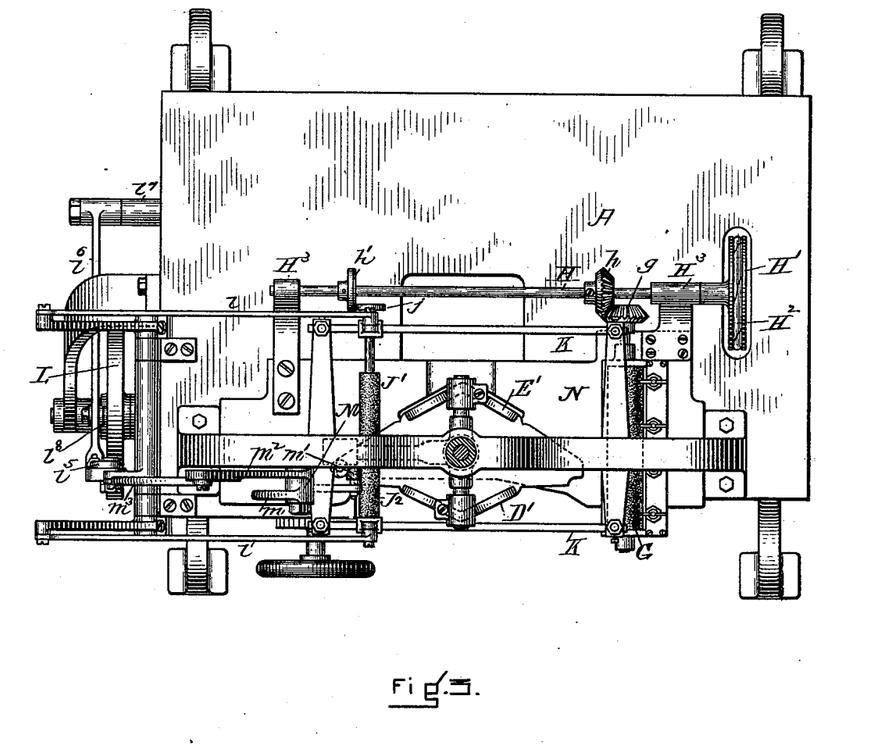
Figure 8:
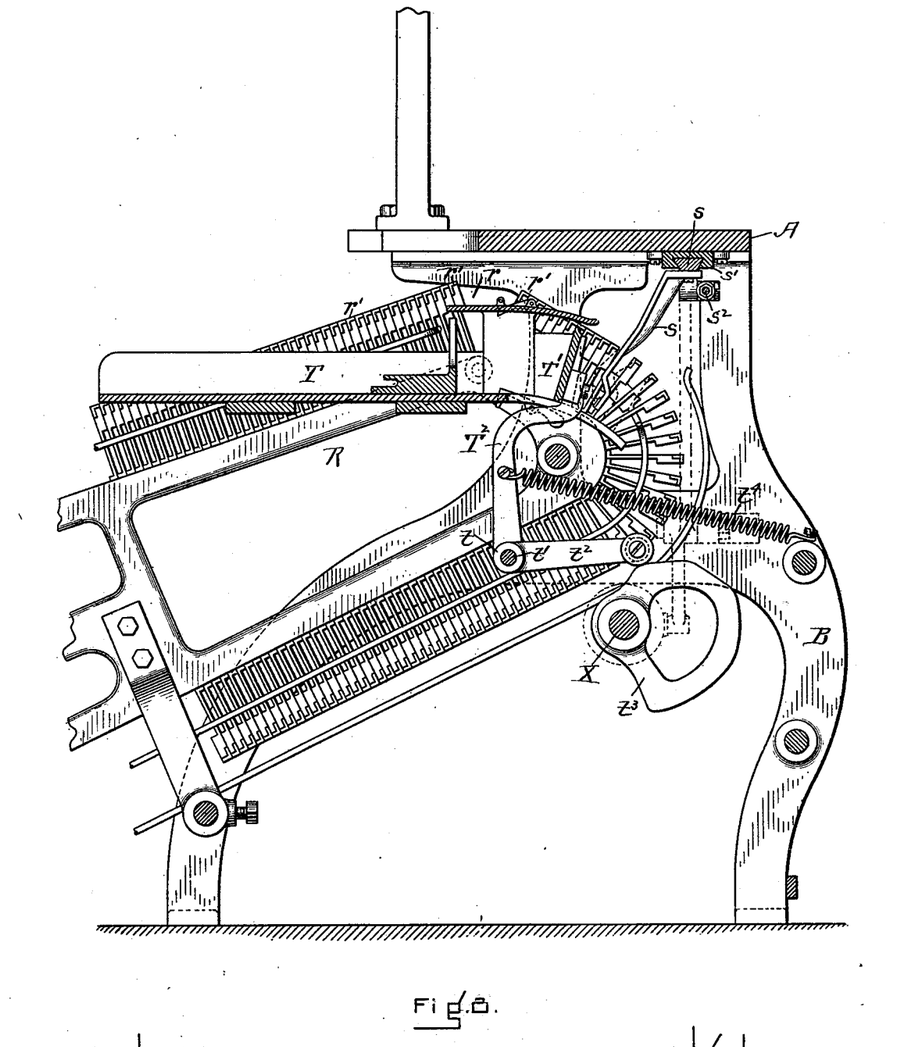
Fig. 8 is a side view, partly in section, showing a portion of the drier and the means for withdrawing the envelop therefrom, Fig. 9 being a rear view showing especially this same mechanism, Fig. 10 being an enlarged perspective of the withdrawing mechanism.
Figure 9:
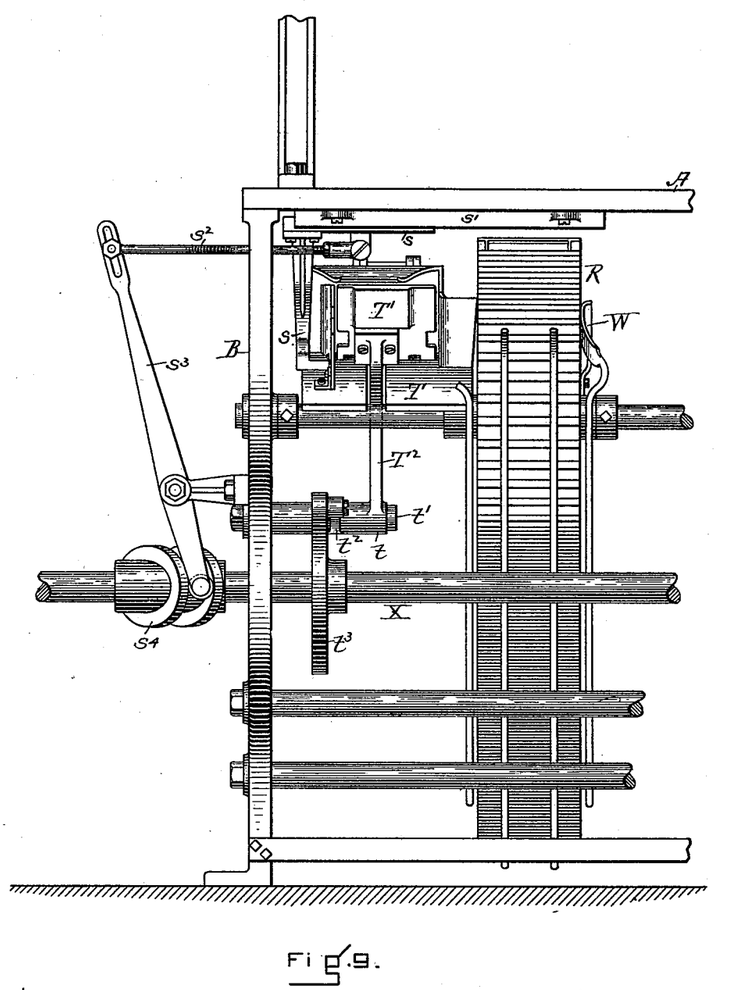
Figure 10:
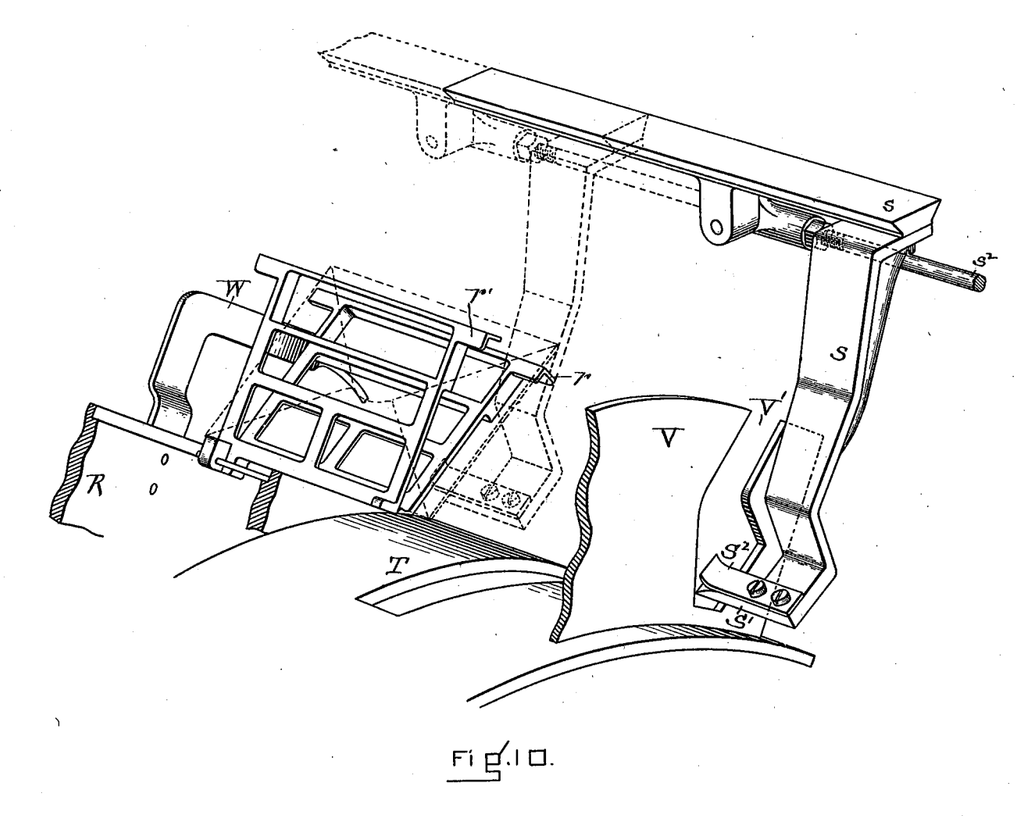

In the bed $q$ of the folding-box, which rests upon the table A of the machine, there are a number of holes $q'$, in each of which is set a pin $q^2$, supported therein by a spring $q^3$ in such manner that the top of each pin will project ordinarily, say, about one-sixteenth of an inch above the upper surface of the folding-box bed. Each hole has a shoulder $q^4$, against which the under side of the head is held by the spring. When the envelop is forced into the box by the plunger, it will rest upon the heads of these projecting pins. As the folders fold the flaps in succession their pressure depresses the pins, so that the blank is folded upon the plane surface of the bed. When, however, the folders lift, the strength of the springs $q^3$ is sufficient to lift the pins $q^2$, so that they separate the under surface of the envelop now folded from the surface of the folding-box bed, so that the blank is in position to be taken from the folding-box by any of the ordinary means used for that purpose—for example, the pushers shown in the patent referred to—or if the bed be tilted will fall therefrom. The pins $q^2$, above described, need project only far enough above the surface of the folding-bed to make an air-space between the envelop and the bed or separate the envelop therefrom when the folding pressure has been relieved. The springs which support them should be very light, sufficient only in strength to cause this separation, and the depth to which the pins shall sink when under pressure should be sufficient to allow the folding-bed to present a perfectly-smooth surface to the back of the envelop during the folding operation, for it is evident that if any projections existed on the upper side of the folding-bed during the folding operation they would indent or possibly cut the paper of the envelop, so as to render the envelop worthless. It is also to be noted that such pins as are described do not necessarily serve the purpose of lifting the envelop into the path of any ejecting mechanism, but only to insure a separation between the envelop and the bed, which separation might not otherwise take place in cases where, for example, the back of the blank has been recently printed and the ink has not been thoroughly dried before the blank has been put into the envelop-machine. It has been found by experience that should such sticking exist the envelops would not be properly ejected, and, moreover, even if the first few of a series of printed blanks were ejected a small deposit of ink might be left with each blank, which as it accumulated would cause the subsequent blanks to stick unless such pins were used. For this reason I have found the device shown in the drawings extremely useful. The envelop on leaving the folding-box falls into a pocket $r$, formed by two of the fingers $r'$ in the drier R. This drier R is shown as of the variety known as a "chain" drier and may be supported and operated intermittently in any of the well-known ways now used for that purpose. The drier moves in the direction of the arrow shown in Fig. 1, and when the drier has made nearly a complete revolution the envelop is dry, and the fingers $r'$ at this point separate, so that the envelop may be withdrawn. The withdrawing mechanism will be more particularly understood by reference to Figs. 8, 9, and 10. This mechanism consists of an arm S, mounted on a slide $s$, running in ways $s'$ on the under side of the table A. The slide $s$ is given a reciprocating movement such that the arm S, which projects to very nearly the lower surface of the pockets $r$ of that portion of the drier R alongside of it, will vibrate between a position within reach of the side of the drier and a position somewhat farther therefrom than the width of the envelop to be drawn out of the drier, this movement being given to the slide $s$ by means of a connecting-rod $s^2$, lever $s^3$, and cam $s^4$ on the shaft X. (See Fig. 9.) The lower end of the arm S has projecting from it in the direction toward the drier a finger S', to which is fastened a finger S², made of thin spring metal and forming a leaf-spring, bearing near its free end against the finger S', so as to form, in effect, a clip the ends of which spread slightly, so as to fit onto the edge of an envelop in the drier, nip it, and withdraw it therefrom. This part, which I have called a "clip," it will be noted, is a device in which the parts have a fixed relation to each other—that is to say, are not hinged and do not require any additional mechanism to open or close them, the spring member or members, if there be two springs, being permanently attached to each other, the projecting portions, however, being adapted to open and allow the envelop to slip between them, the spring having sufficient tension to hold the envelop and withdraw it out from the drier as the arm S moves back. The movement of the arm S, therefore, toward the drier causes the parts of this clip to pass one on each side of the envelop which enters between them and grip the envelop and on its return movement to withdraw the envelop from the drier, this operation taking place, of course, during one of the dwells in the intermittent movement of the drier.

T is the "till" or "case," so called, in which the envelops are collected and from which they are taken by the attendant. Each envelop is pushed into this till by means of an oscillating shovel T', mounted on the end of the crooked rocker-arm T², carried by a sleeve $t$ on the stud $t'$, which sleeve also carries a second arm $t^2$, operated by a cam $t^3$, mounted on the cam-shaft X, a spring $t^4$ holding the cam-roll to its work, this mechanism and mechanism in the till for receiving the envelop from the shovel being also old in the art.

To withdraw the envelop from the clip S' S², I provide a plate or frame V, which is slotted at V' to allow the arm S to pass through it and yet to engage the envelop. This plate V is placed on the farther side of the shovel from the drier, so that the shovel will easily clear it as it oscillates. It will be noticed that the clip S' S² seizes the envelop to withdraw it from the drier slightly above its lower edge. As the arm S passes through the slot V' the side of the envelop held by its clip will strike the plate V near its lower edge and its upper edge, and as the arm S continues its movement the envelop will be withdrawn from the clip and left upon the shovel, which lies in its lowest position at this moment. The operations given to this shovel by the cam $t^3$ are such that when the envelop is being withdrawn from the drier by the arm S and is engaging the plate V the shovel is in its lowest position, after which the shovel T' moves up and places the envelop in the till. After it has passed the arm S and while it is carrying the envelop into the till the arm S moves up again toward the drier to take another envelop, the shovel T' dropping again to its lower position as soon as the arm S is out of the way.

In order to insure the envelop being within reach of the clip S' S², I prefer to carry an ordinary guide-rod W, which is customary in chain driers, to a point opposite the line of movement of the arm S, so that it will prevent the envelop from being pushed through the chain when the clip strikes it. This rod W may be crooked slightly, thus forming a cam-surface, as at W', to guide the envelop as it approaches the withdrawing mechanism in a direction toward the withdrawing mechanism, thus enabling the stroke of the withdrawing-arm to be shortened.

My improvements above described are all of them simple and easy of construction and when used together in the manner described coöperate efficiently to increase the speed, and hence the value, of an envelop-machine, as well as the value of its product.

What I claim as my invention is—

1. In an envelop-machine in combination with a gum-box located on one side of the machine and carrying a roll and a gummer mounted on the opposite side of said machine and having a restricted movement toward and from said gum-box though not into engagement therewith, a gum-roll and means whereby it is caused to travel from a position in contact with said gum-box roll to a position in contact with said gummer when said gummer is in its postion nearest said gum-box, as set forth.

2. In an envelop-machine, in combination with pickers adapted to gum the back and seal flap of the envelop-blank, and a traveling gum-roll adapted to move under said pickers transversely of the machine, an end picker and traveling gummer for said end picker adapted to move under and into contact with it and into contact with and away from said gum-roll, as and for the purposes set forth.

3. In combination with a gum-box located upon one side of the machine, a gum-roll adapted to travel toward and from said gum-box to take gum therefrom, and a traveling gummer located upon the farther side of said machine from said gum-box, adapted to be moved toward and from said gum-roll, and means whereby motion is given to said gum-roll and gummer to bring them into contact, as and for the purposes set forth.

4. In an envelop-machine, in combination with pickers for the back and seal flap of the envelop and a picker for the end flap, a gum-box, a reciprocating gum-roll and means whereby it is caused to travel, said means comprising an actuating-lever and connecting-rods connecting said lever with said gum-roll and with a source of motion, in combination with a gummer mounted on the end of an oscillating arm and adapted to travel into contact with said gum-roll and also to gum said end picker, said oscillating arm being connected to said gum-roll-moving lever, as set forth.

5. In an envelop-machine in combination with a gum-box and its roll located on one side of the machine and a gummer mounted on the other side thereof and having a restricted movement toward and from said gum-box, a gum-roll, means whereby it is caused to travel from a position in contact with said gum-box roll to a position in contact with said gummer when said gummer is nearest to said gum-box, and means whereby it is rotated while in contact with said gummer, as set forth.

6. In an envelop-machine a gum-box located on one side of said machine and having a gum-roll mounted upon a shaft carrying a bevel-gear, the shaft H carrying a similar bevel-gear engaging therewith, a traveling gum-roll also mounted on a shaft and means for reciprocating said gum-roll across the machine and means for rotating said gum-roll when in its position farthest from said gum-box, said means comprising a disk $h'$ mounted on the shaft H and engaging the disk $j'$ on the end of said gum-roll shaft in combination with means for receiving the gum from said gum-roll, said means being located on the side of the machine farthest from said gum-box and in position to engage with said gum-roll during its rotation, all as described.

7. In an envelop-machine a folding-box having suitable folders and means for withdrawing the envelop therefrom, the bottom of said folding-box being perforated and provided with yielding pins adapted to be pushed below the level of the folding-bed by the pressure of said folders, substantially as and for the purposes set forth.

8. In an envelop-machine a folding-box having suitable folders and means for withdrawing the envelop therefrom, and a folding box-bed of the kind described, a portion of the surface of which normally projects above the main surface and is adapted to yield upon the application of pressure, to the general level of said folding box-bed and return to its normal projecting position when said pressure is released, as and for the purposes set forth.

9. In an envelop-machine in combination with means for gumming and creasing the envelop-blank, means for folding the envelop consisting of a folding box-bed having mounted thereon a series of folders for folding envelop-flaps, said folding box-bed being provided with a series of yielding projections the upper surfaces of which are adapted to be depressed to the level of said bed by pressure of said folders and upon the release of said pressure to return to their projecting position, as and for the purposes set forth.

10. In an envelop-machine the combination of a drier, an arm located at one side thereof and arranged to move toward and from said drier in a line parallel with the axis thereof, and having jaws which are normally held closed with a yielding pressure mounted on the free end of the arm so as to move therewith, substantially as described.

11. In an envelop-machine the combination of a drier, a bent arm located at one side thereof and arranged to move toward and from the drier, and jaws which are normally held closed with a yielding pressure, mounted on the free end of the arm so as to move therewith, and a plate located in the path of said arm and provided with a slot of substantially the shape of the said arm, adapted to allow the arm to pass therethrough and to prevent the passage of the envelop and withdraw it from said jaws, as and for the purposes described.

12. In an envelop-machine the combination of a drier, an oscillating shovel and means for withdrawing the envelop from said drier, said means consisting of a bent arm located on one side thereof and arranged to move toward and from the drier, jaws which are normally held closed with a yielding pressure mounted on the free end of the arm so as to move therewith, said arm and said shovel crossing each other's paths, and means for withdrawing the envelop from said jaws located to allow the envelop to fall upon said shovel, said means consisting in a plate slotted with a slot of substantially the shape of said bent arm whereby said arm will pass therethrough but said envelop will be restrained from passing therethrough and will fall upon said shovel, as and for the purposes described.

13. In combination with a drier and with means consisting of a reciprocating arm for withdrawing an envelop therefrom, a surface located on the farther side of the drier from said arm and adapted to engage each envelop in turn at a point in a plane with the reciprocation of said arm and hold it while it is being engaged by said withdrawing mechanism, as and for the purposes described.

14. In combination with a drier and with means adapted to reciprocate toward and from one side of said drier for withdrawing an envelop therefrom, a cam-surface located upon the opposite side of said drier from said withdrawing mechanism in advance of the plane of reciprocation of said withdrawing mechanism and adapted to engage each projecting envelop in turn as it approaches the point at which it is withdrawn from the drier and insure its engagement with said withdrawing mechanism, as set forth.

In testimony whereof I have hereunto set my name this 26th day of July, 1900.

JOHN A. SHERMAN.

Witnesses:
   GEORGE O. G. COALE,
   M. E. FLAHERTY.